United States Patent [19]

Keller

[11] 3,718,870

[45] Feb. 27, 1973

[54] DRIVING CIRCUIT FOR ELECTRO-MECHANICAL OSCILLATORS

[75] Inventor: Hans Keller, D78 Freiburg, Germany

[73] Assignee: ITT Industries, Inc., New York, N.Y.

[22] Filed: Aug. 12, 1971

[21] Appl. No.: 171,580

[52] U.S. Cl.............331/116 M, 58/23 A, 58/23 AO, 331/108 A

[51] Int. Cl...............................................H03b 5/30

[58] Field of Search..........331/116, 108 A, 154, 156; 58/23

[56] References Cited

UNITED STATES PATENTS

| | | | |
|---|---|---|---|
| 3,218,577 | 11/1965 | Fischman | 331/108 A |
| 3,530,662 | 9/1970 | Schoninger | 58/23 R |

FOREIGN PATENTS OR APPLICATIONS

| | | | |
|---|---|---|---|
| 1,009,209 | 11/1965 | Great Britain | 331/116 M |

*Primary Examiner*—John Kominski
*Attorney*—C. Cornell Remsen, Jr.

[57] ABSTRACT

This invention relates to a circuit for driving an electro-mechanical oscillator (balance wheels, pendula, tuning forks) in an electronic watch. In a circuit with only one coil and two transistors, a forward biased diode is provided in series with the coil which results in sparing one of two batteries.

6 Claims, 5 Drawing Figures

INVENTOR
HANS KELLER
BY Vincent B. Ingrassia
AGENT

INVENTOR
HANS KELLER
BY Vincent B. Ingrassia
AGENT

INVENTOR
HANS KELLER
BY Vincent B. Ingrassia
AGENT

DRIVING CIRCUIT FOR ELECTRO-MECHANICAL OSCILLATORS

BACKGROUND OF THE INVENTION

This invention relates to a circuit arrangement comprising two complementary transistors for driving electro-mechanical oscillators (balance wheel, tuning fork, pendula, etc.) with the aid of one single coil and a magnet system which are moved in relation to one another, with the coil lying in the collector branch of the one transistor (driving transistor), and the base of the other transistor (control transistor) being coupled to the collector of the driving transistor, and the base of the driving transistor being d.c. coupled to the collector of the control transistor.

For driving electro-mechanical oscillators as used, for example, in clocks or watches as balance wheels, tuning forks, pendula, etc., it is well known to use electronic transistor circuits. These circuits can be divided into two classes, namely into those maintaining the mechanical oscillation with the aid of two coils — one control and one driving coil — and those requiring only one single (driving) coil.

Such single-coil circuits for driving clocks or watches, usually contain two transistors which are complementary in relation to one another, i.e., one driving transistor in the collector branch of which there is connected the (driving) coil, and one control transistor the base of which, via suitable circuits elements, is connected to the collector of the driving transistor, and whose collector, if necessary, via further circuit elements, is connected to the base of the driving transistor.

From such types of circuits there will result some advantages when the coupling between the two transistors is effected with respect to direct current. One such circuit is known from the German published application (DOS) No. 1,448,348. This circuit offers the advantage of starting automatically within a short time. It is of a considerable disadvantage, however, that two sources of supply voltage have to be used.

This conventional circuit arrangement is shown in FIG. 1 of the accompanying drawings. The two sources of supply voltage $U_{B1}$ and $U_{B2}$ are connected in series with the one end of the coil L being connected to the common point therebetween, and with the other end of the coil being connected to the collector of the driving transistor T1. Moreover, the collector of the driving transistor T1 is coupled to the base of the complementary control transistor T2 via the parallel combination of resistor R1 and capacitor C1. The collector of control transistor T2 is connected to the base of the driving transistor T1. The emitter of the control transistor T2 is coupled to the negative pole of the source of supply voltage $U_{B2}$ via the parallel combination of resistor R2 and capacitor C2. The emitter of the driving transistor T1 is connected to the circuit ground which is identical to the positive pole of the source of supply voltage $U_{B1}$.

The coil cooperates with a (not shown) magnet system of any arbitrary kind which system induces voltages in the coil, and is in turn acted upon by the magnetic field generated by the coil, so as to drive the mechanical oscillator in cases where both the coil and the magnet system are moved in relation to one another.

SUMMARY OF THE INVENTION

It is the object of the invention to provide a circuit arrangement which is capable of operating with one single source of supply voltage.

According to the invention this is accomplished in that, in series with the coil, there is connected a diode which is polarized in the forward direction of the collector current of the driving transistor, and in that there is only provided one source of supply voltage. Relative thereto, the diode may be arranged between the end of the coil which is distant from the collector, and the source of supply voltage, or else between the collector of the driving transistor and the coil.

One further embodiment of the invention resides in the fact that the emitter-collector path of an additional or auxiliary transistor is connected parallel in relation to the diode, that the collector of the auxiliary transistor is connected to the point connecting both the diode and the coil, and that the base thereof is coupled with respect to direct current to the other end of the coil. In these circuit arrangements it is suitable to connect the emitter of the control transistor to the source of supply voltage with respect to both direct- and alternating-current voltage. On the other hand those types of embodiments of the inventive circuit arrangements in which the one end of the coil is connected to the source of supply voltage, can still be improved in that the emitter of the control transistor, with respect to AC voltage, is coupled to the source of supply voltage and, with respect to DC voltage, is coupled to the point connecting both the coil and the diode.

DESCRIPTION OF THE PREFERRED EMBODIMENTS

Figure 2:
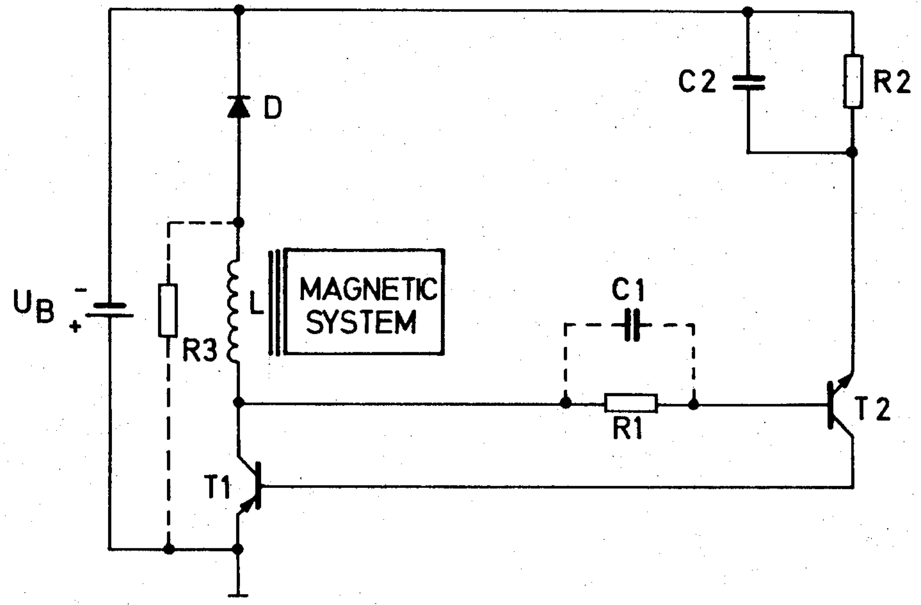
FIG. 2, shows the one type of embodiment of the inventive circuit arrangement.

FIG. 2 shows the one type of embodiment of the inventive circuit arrangement in which the diode D and the coil L are connected in series in such a way that the diode D is connected to the source of supply voltage $U_B$, and the coil L is connected to the collector of the driving transistor T1. In this case it may be appropriate, to connect to the point connecting both the diode D and the coil L, one end of the resistor R3, with the other end of resistor R3 being connected to the circuit ground. With the aid of this resistor, and by means of the diode D, there is adjusted a preconduction current, so that at the diode there will occur a voltage drop which is extensively independent of the transistor leakage currents.

Figure 3:
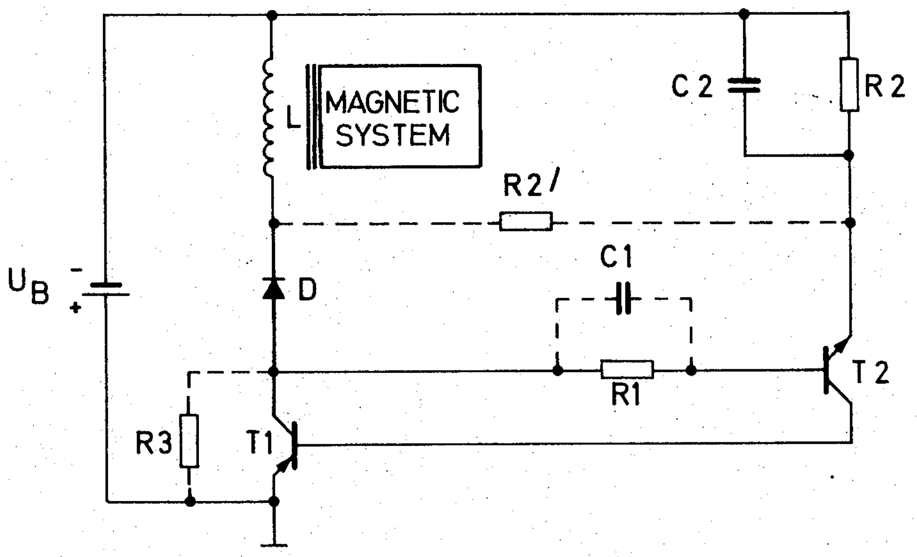
FIG. 3, shows the other type of embodiment of the inventive circuit arrangement.

FIG. 3 shows the other type of embodiment of the inventive circuit arrangement. In this case the coil L and the diode D are in such a way connected in series that the coil L is connected to the source of supply voltage $U_B$, and the diode D is connected to the collector of the driving transistor T1.

Also in this type of embodiment it may be appropriate to provide the resistor R3 which, in the example of embodiment of FIG. 3, is connected between the circuit ground and the terminal of the diode D as connected to the collector of the driving transistor T1.

It should still be mentioned that, of course, also in the example of embodiment according to FIG. 2, the resistor may be connected between the collector of the driving transistor T1 and the circuit ground. The preconduction current of the diode D will then, just like in the circuit arrangement according to FIG. 3 flow through the coil L. In some cases, however, this may be unfavorable, so that in the example of embodiment according to FIG. 2, there will be preferred the variety as described hereinbefore, in which the resistor is connected to the point connecting both the diode D and the coil L.

Figure 1:
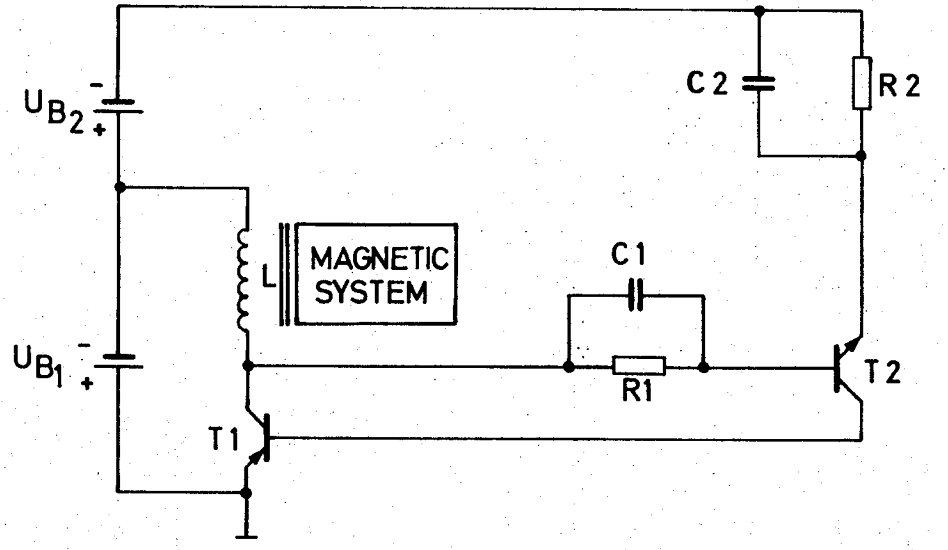
Fig. 1 PRIOR ART
FIG. 1, shows the conventional circuit arrangement.

Referring again to FIG. 3, in the quiescent state transistor $T_2$ is conductive. The base current required which was delivered by the battery $U_B2$ in FIG. 1, is now delivered by diode D on which the base-emitter voltage of transistor $T_2$ drops. If the resistor $R_3$ is not present, this voltage drop can be caused by the leakage current of the transistor $T_1$ which is non-conductive during the quiescent state since the circuit is a monostable multivibrator.

If by noise or a slight deflection of the magnetic system a voltage is induced in the coil being more positive at the cathode of the diode D than at the end of the coil connected to the source of supply voltage $U_B$, an increasing base current flows in transistor $T_2$, and therefore a greater collector current. This collector current opens transistor $T_1$ whereby a driving pulse is generated in coil L. The duration of this driving pulse is determined by the shape of the voltage induced in the coil L and the charging time constant of the capacitor $C_2$ charged via the emitter of transistor $T_2$.

The pulse duration can also be modified and influenced by capacitor $C_1$. Depending on the feedback in the circuit, the transistor $T_2$ is blocked until the end of the duration of the driving pulse at which time transistor $T_2$ becomes conductive, since its base voltage becomes more positive than its emitter voltage by the charging of capacitor $C_2$. Therefore, the magnetic system and the mechanical oscillator are more and more deflected by each cycle until the desired mechanical amplitude is reached.

The effect of the diode D as provided according to the invention, is seen in the fact that the control transistor T2, owing to the flow characteristic of the diode D which is adapted to the input characteristic thereof, will draw a well-defined steady current which is extensively stabilized with respect to temperature variations. In this way there is safeguarded the reliable self-starting of the electro-mechanical oscillator.

Figure 4:
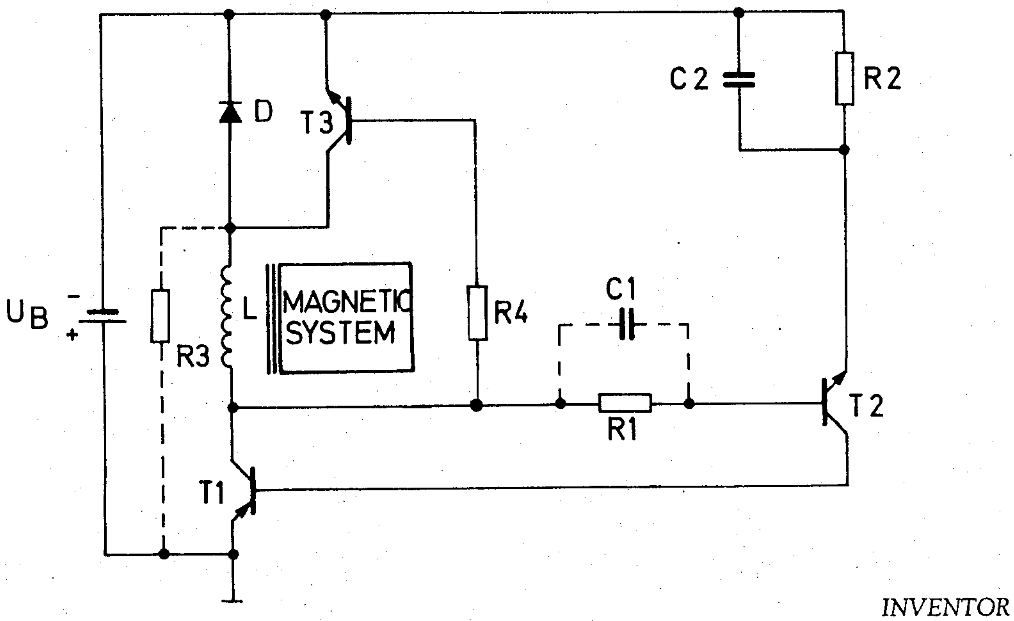
FIG. 4, shows one advantageous further embodiment of the circuit arrangement according to FIG. 2.
Figure 5:
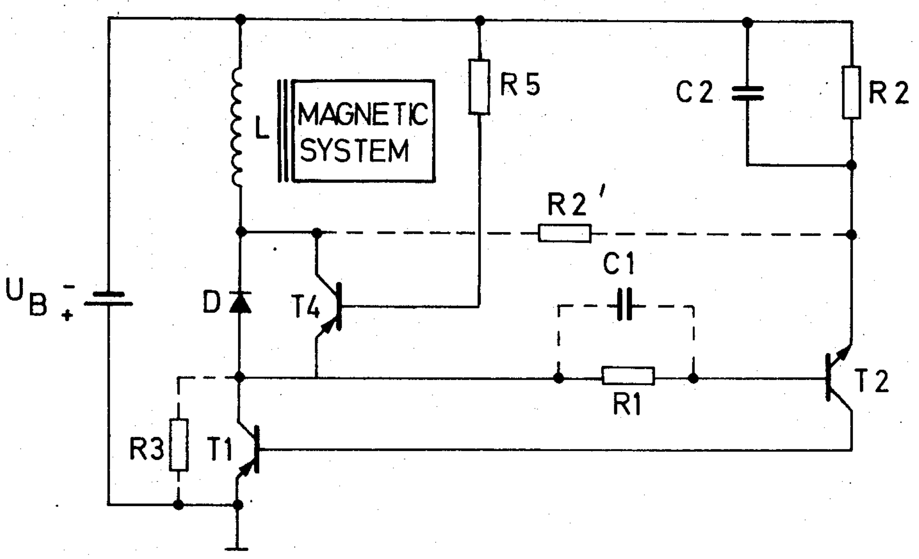
FIG. 5, shows one advantageous further embodiment of the circuit arrangement according to FIG. 3.

In FIGS. 4 and 5 there are shown further embodiments of the inventive type of circuit arrangement serving to reduce the voltage drop of the diode D in cases where the driving transistor T1 is driven into saturation and which, when using silicon components, the voltage drop across diode of amounts to about 0.7 volt, and is thus only half as large as the usually employed supply voltage of about 1.35 volt. In this case the diode D is bridged by the collector-emitter path of the auxiliary transistor T3 or T4 respectively, which is connected in such a way as to be automatically driven into saturation together with the driving transistor T1.

According to FIG. 4 it is provided in this connection, that the auxiliary transistor T3 is complementary to the driving transistor T1. The collector of the auxiliary transistor T3 is connected to the point connecting both the diode D and the coil L, while the emitter is applied to the source of supply voltage $U_B$. The signal driving the auxiliary transistor T3 into saturation in the same sense as the driving transistor T1, is applied to the base of the auxiliary transistor T3 across the resistor R4, with the end thereof distant from the base, being connected to the collector-sided end of the coil L.

In the further embodiment according to FIG. 5, both the auxiliary transistor T4 and the driving transistor T1 are of the same conductivity type, with the collector of the auxiliary transistor T4 again being connected to the point connecting both the coil L and the diode D. The emitter of the auxiliary transistor T4 is connected to the collector of the driving transistor T1, so that the auxiliary transistor T4 is controlled at the emitter. The base of the auxiliary transistor T4 is connected across the resistor R5, to the source of supply voltage $U_B$, and is thus applied to a fixed potential. In the examples of embodiment according to FIGS. 4 and 5 it will thus be seen that respectively the base of the auxiliary transistor is connected across a resistor to the end of the coil L which is not connected to the diode D.

By using the auxiliary transistor $T^3$ or $T^4$, in the case of a switched-on driving transistor — hence also when the auxiliary transistor is switched on — the voltage drop of the diode is decreased from about 0.7 volt to the collector-emitter saturation voltage of the auxiliary transistor $T^3$ or $T^4$ respectively.

In all of the hitherto explained examples of embodiment of the invention the emitter of the control transistor $T^2$ is connected with respect to DC and AC voltage, via the parallel-RC-circuit $R^2$, $C^2$ to the source of supply voltage $U_B$. In the examples of embodiment according to FIGS. 3 and 5, however, it is particularly appropriate to couple the emitter of the control transistor $T^2$ with respect to DC voltage, not to the source of supply voltage $U_B$ but to that particular end of the coil L which is not connected to the source of supply voltage $U_B$. In FIGS. 3 and 5, therefore, the emitter of the control transistor $T^2$, instead of being connected to the source of supply voltage $U_B$ across the resistor $R^2$, may be connected to that particular end of the coil L not facing the supply voltage, across the resistor $R^{2\prime}$ as indicated by the dashlines.

In this way it is avoided that even in the case of an unfavorable dimensioning of the individual components there will occur a condition in which the two complementary transistors $T^1$ and $T^2$ are permanently switched on (driven into saturation). This measure is of advantage especially in cases where the inventive circuit arrangement is realized in accordance with the known monolithic integration technique, because in this way it will become possible to substantially reduce the effects, as occurring during integration, of the great tolerances of the data of the individual components upon the circuit.

It is to be understood that the foregoing description of specific examples of this invention is made by way of example only and is not to be considered as a limitation on its scope.

I claim:

1. A circuit arrangement for driving an electromechanical oscillator, said oscillator including a magnet system and single coil magnetically coupled thereto, a single source of supply voltage, a drive transistor, a control transistor of complimentary conductivity type to that of said drive transistor, said single source of supply voltage having one side connected to the emitter of said drive transistor and the other side coupled to the collector of said drive transistor and the emitter of the said control transistor said coil coupled to the collector of said drive transistor, the base of said control transistor being coupled to the collector of said drive transistor, the base of said drive transistor being coupled to the collector of said control transistor wherein the improvement comprises:
- a diode connected in series with said coil, said diode being polarized in the forward direction of the collector current of said drive transistor; and
- an additional transistor, the collector of said additional transistor being connected to the common point between one end of said coil and one end of said diode, the emitter of said additional transistor being connected to the other end of said diode and the base of said additional transistor being coupled to the other end of said coil.

2. A circuit arrangement according to claim 1 wherein said diode is connected between said coil and said source of supply voltage.

3. A circuit arrangement according to claim 1 wherein said diode is connected between the collector of said drive transistor and said coil.

4. A circuit arrangement according to claim 1, wherein said additional transistor is complementary to said driving transistor.

5. A circuit arrangement according to claim 1, wherein said additional transistor is complementary to said control transistor.

6. A circuit arrangement according to claim 3, wherein the emitter of said control transistor is AC coupled to said source of supply voltage and DC coupled to the common connection between said coil and said diode.

In FIGS. 4 and 5 there are shown further embodiments of the inventive type of circuit arrangement serving to reduce the voltage drop of the diode D in cases where the driving transistor T1 is driven into saturation and which, when using silicon components, the voltage drop a cross diode of amounts to about 0.7 volt, and is thus only half as large as the usually employed supply voltage of about 1.35 volt. In this case the diode D is bridged by the collector-emitter path of the auxiliary transistor T3 or T4 respectively, which is connected in such a way as to be automatically driven into saturation together with the driving transistor T1.

According to FIG. 4 it is provided in this connection, that the auxiliary transistor T3 is complementary to the driving transistor T1. The collector of the auxiliary transistor T3 is connected to the point connecting both the diode D and the coil L, while the emitter is applied to the source of supply voltage $U_B$.

* * * * *

UNITED STATES PATENT OFFICE

CERTIFICATE OF CORRECTION

Patent No. 3,718,870 Dated February 27, 1973

Inventor(s) Hans Keller

It is certified that error appears in the above-identified patent and that said Letters Patent are hereby corrected as shown below:

30 Add --- Foreign Application Priority Date

August 22, 1970 Germany....................P 20 41 828.4

Signed and sealed this 5th day of March 1974.

(SEAL)
Attest:

EDWARD M.FLETCHER,JR.
Attesting Officer

C. MARSHALL DANN
Commissioner of Patents

ORM PO-1050 (10-69)

USCOMM-DC 60376-P69
★ U.S. GOVERNMENT PRINTING OFFICE : 1969 O—368-334